No. 699,455. Patented May 6, 1902.
H. T. CRONK.
COMBINED HOSE AND ELECTRIC SIGNALING DEVICE.
(Application filed Mar. 5, 1901.)
(No Model.)
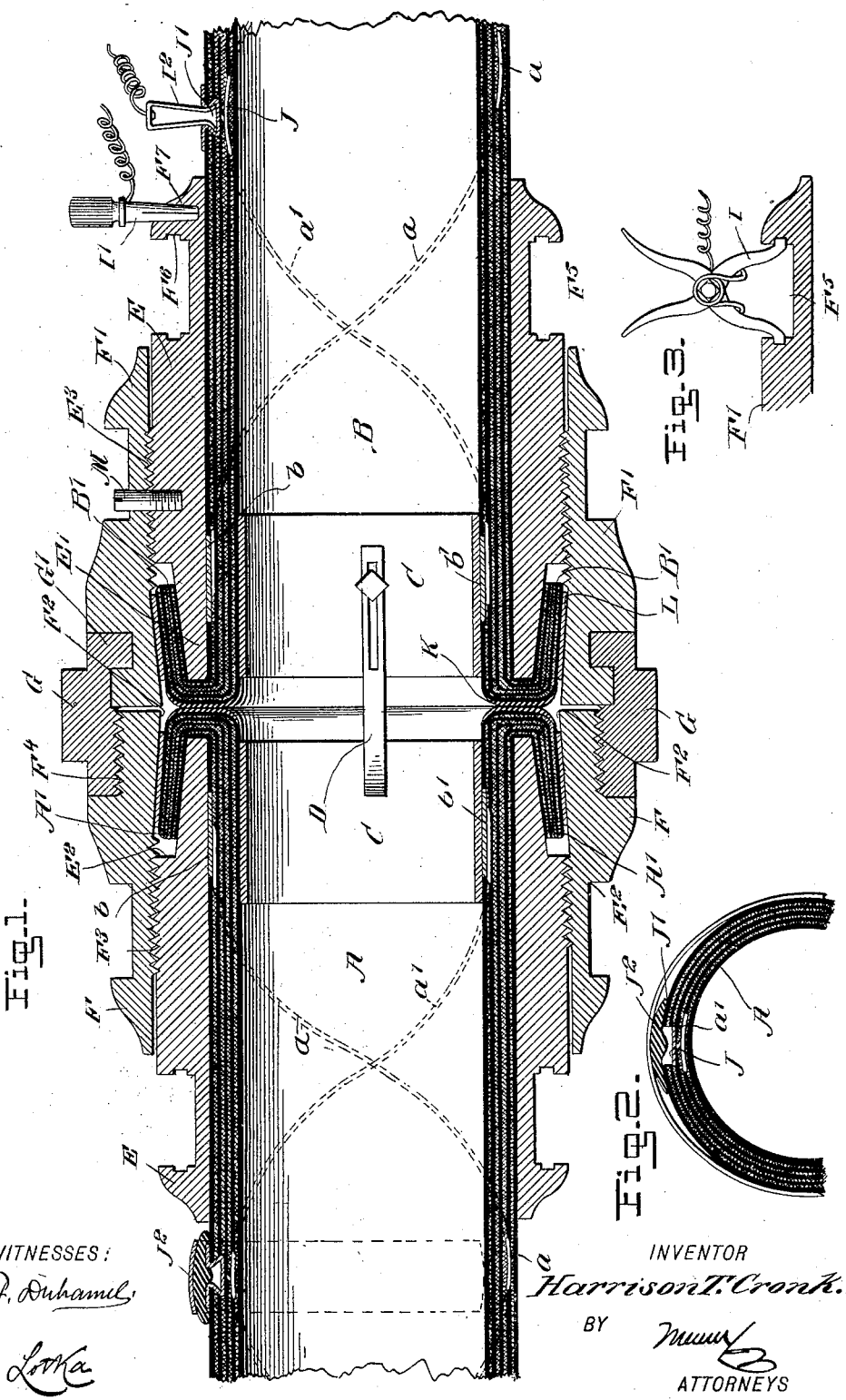
WITNESSES:
James F. Duhamel
John Locka
INVENTOR
Harrison T. Cronk.
BY
ATTORNEYS

UNITED STATES PATENT OFFICE.

HARRISON T. CRONK, OF NEW YORK, N. Y.

COMBINED HOSE AND ELECTRIC SIGNALING DEVICE.

SPECIFICATION forming part of Letters Patent No. 699,455, dated May 6, 1902.

Application filed March 5, 1901. Serial No. 49,773. (No model.)

*To all whom it may concern:*

Be it known that I, HARRISON T. CRONK, a citizen of the United States, and a resident of the city of New York, borough of Manhattan, in the county and State of New York, have invented a new and Improved Combined Hose and Electric Signaling Device, of which the following is a full, clear, and exact description.

My invention relates to a hose combined with an electric signaling device, and has for its object to provide a simple coupling particularly adapted for connecting the hose-sections of fire-engines and in a general way for connecting sections of hose for the conveyance of any fluid under pressure—such as water, steam, or compressed air—said coupling being designed to preserve a tight joint even at high internal pressure and to allow of the connection being quickly made and unmade and to provide a complete separation or insulation of metal parts of the coupling from the inner surface of the hose, thus permitting its use in connection with an electric circuit along the hose to prevent short-circuiting at the junction of hose-sections, or of a section with a nozzle or stand-pipe, or of a nozzle with a stand-pipe.

A further object of my invention is to render the hydraulic and electric connections between adjacent sections of the hose more or less independent of each other, so that in coupling the hose the electric conduit may be coupled or not, as desired.

The invention will be fully described hereinafter and the features of novelty pointed out in the appended claims.

Reference is to be had to the accompanying drawings, forming a part of this specification, in which similar characters of reference indicate corresponding parts in all the views.

Figure 1 is a longitudinal section of a hose-coupling constructed according to my invention. Fig. 2 is a partial cross-section thereof, and Fig. 3 is a detail of an electric connecting device.

A and B are two hose-sections made, as usual, of a material which is a non-conductor of electricity. The sections contain conducting-wires $a$ $a'$, preferably arranged spirally to prevent their breaking when the hose is stretched lengthwise by the pressure of the water or when the hose is wound or bent, and the ends of the wires are connected with conducting plates or disks $b$ $b'$, located, respectively on the outside and on the inside of the hose adjacent to the ends thereof. The inside plates $b'$ are engaged by brass rings C, of substantially ordinary construction, and the connection between the rings of adjacent hose-sections is effected in any suitable manner—for instance, by means of a spring D attached to one section and in contact with both rings C. Preferably the spring D is arranged to slide inward on the ring C to which it is attached, and when the hose-sections are disconnected the spring may be moved inward into the hose, so that it will not project therefrom.

The adjacent ends of the hose-sections are turned outward, as shown at $A'$ $B'$, and when it is necessary to cut the hose at the end for this purpose the openings or slits are filled with rubber-cement or some similar substance. Into the space between the body of the hose and the turned-over portion or flange $A'$ or $B'$ fits the beveled end $E'$ of an inner coupling-section E, generally made of brass. This inner coupling-section has a shoulder $E^2$, corresponding approximately to the thickness of the material out of which the hose is made, and a screw-threaded portion $E^3$. The coupling further comprises clamping-sections F F', having their inner ends $F^2$ beveled correspondingly to and parallel with the beveled portions $E'$ of the inner sections.

The clamping-sections F F' have interior screw-threads $F^3$ to fit the threads $E^3$ of the inner sections E. One of the outer sections F has a recess with an exterior screw-thread $F^4$, adapted to be engaged by threads at one end of the central coupling-nut G, which at its other end has an inward flange or projection $G'$, adapted to interlock with an outward flange or projection on the inner end of the clamping-section F'. The sections E may be provided with recesses $F^5$, having pockets $F^6$ to receive the spring-pressed ends of a connecting device I. Instead of this the inner sections may have recesses, as $F^7$, for the insertion of an ordinary connecting-plug $I'$. At suitable points of the hose I provide metallic plates or disks J, connected with the inner wire $a'$ and recessed, as at $J'$, to receive a connecting-spring $I^2$. An insulating-cap $J^2$ may be used to cover the recess $J'$ when the spring $I^2$ is not in use, so as to prevent short-circuiting when the hose is lying in puddles of water.

To still improve the joint of the turned-over hose ends, I may seal or cement rubber bands K on those portions of the hose-sections which are adapted to abut against each other. Further, to hold the hose ends in position temporarily I provide thin conical brass rings or collars L, arranged to fit loosely between the flanges $A'B'$ and the beveled inner faces $F^2$ of the clamping coupling-sections F F'.

In practice one of the clamping-sections F remains connected with one hose-section end and the other clamping-section F', with the nut G, remains connected with the other hose end. To couple the hose-sections, the spring D is first projected from the hose-section carrying it and the angles or bends of the hose at $A'$ $B'$ are brought together. Then the clamping-sections F F' are drawn together by turning the nut G. It will be understood that when the parts are assembled the clamping-sections F F' are screwed outwardly on the inner sections E, when the beveled surfaces $F^2$ will slide on the conical brass rings L and clamp the hose-flanges $A'$ $B'$ between said rings and the beveled surfaces $E'$ of the inner sections E. The inner and clamping sections may then be locked together by means of screws M. The abutting flanges $A'$ $B'$ or the rubber bands K, if used, will be pressed tightly together, effecting a perfect joint, backed or strengthened by outer or clamping sections F F', so that the greater the internal pressure the tighter and the better insulated will be the joint.

It will be observed that the metallic sections E F F' of the coupling and the nut G are entirely separated from the flowing water by the body of the hose made of insulating material. The said coupling-sections are in permanent connection with the wires $a$, owing to the engagement of the inner sections E with the contact-plates $b$. All the wires $a$ are connected through the medium of the metallic coupling-sections, and all the wires $a'$ are connected through the medium of the rings C and springs D. These wires can be used for signaling in an obvious manner. At the engine, for instance, a signaling apparatus, as a gong, with its battery, or a telephone, will have one of its terminals connected with the wires $a$ and the other with the wires $a'$ through the medium of any suitable device, as the connecting devices I I' $I^2$. At the nozzle or at any intermediate point of the hose similar devices will be used to include in the circuit a transmitter, a circuit-closer, or any other appliance by means of which communication may be had with the apparatus at the engine. As the outer wires $a$ and the metallic parts connected therewith cannot come in contact with the water, there is no danger of a short circuit.

Having thus described my invention, I claim as new and desire to secure by Letters Patent—

1. A hose having two wires embedded therein out of contact with each other, and contact-plates arranged on the inside and outside respectively of the hose and each connected with one of the said wires.

2. A hose having two wires embedded therein out of contact with each other, contact-plates arranged on the inside and outside respectively of the hose at the end thereof and each connected with one of said wires, a conducting-ring arranged within the hose in contact with one of said plates, and a coupling-section arranged on the outside of the hose and in engagement with the other contact-plate.

3. A hose having two wires embedded therein out of contact with each other, contact-plates arranged on the inside and outside respectively of the hose at the end thereof and each connected with one of said wires, a conducting-ring arranged within the hose in contact with one of said plates, a connecting member in electrical connection with said ring and arranged to project into an adjacent hose-section to engage the ring thereof, and a coupling-section arranged on the outside of the hose and in engagement with the other contact-plate.

4. A hose having two wires embedded therein out of contact with each other, contact-plates arranged on the inside and outside respectively of the hose at the end thereof, and each connected with one of said wires, a conducting-ring arranged within the hose in contact with one of said plates, a connecting member slidable in and out of the hose at the end thereof and in electrical connection with the said ring, said connecting member being arranged to project into an adjacent hose-section to engage the ring thereof, and a coupling-section arranged on the outside of the hose and in engagement with the other contact-plate.

5. A hose, having a wire embedded therein, contact members connected with the ends of the wire and arranged on the inside of the hose, and a connecting member in electrical connection with one of said contact members and arranged to project into an adjacent hose-section, to engage the contact member thereof.

6. The combination of two hose-sections each having two insulated conductors embedded therein, one conductor having its ends exposed on the inner surface of the hose, and the other on the outer surface thereof, the abutting ends of the hose-sections being turned over or back outwardly, forming flanges, means for connecting electrically the conductors exposed on the inner surface of the hose, and a coupling in electrical connection with the other conductors and having projections extending into the spaces between the bodies of the hose-sections and the flanges thereof, and portions engaging the outer surfaces of said flanges, to press the hose ends together tightly and prevent short-circuiting by leaks.

7. The combination of hose-sections each having two insulated conductors embedded therein, one conductor having its ends exposed on the inner surface of the hose and the other on the outer surface thereof, the hose having a recess in its outer surface, a conducting-plate located in said recess and connected with that conductor which has its ends exposed on the inner surface of the hose, a removable insulating-cap covering said recess, and means for connecting adjacent hose-sections and the conductors thereof.

8. The combination of a coupling having its metal parts separated and insulated from the inner surface of the hose, with an electric circuit, one leg or wire of which passes inside the hose at the coupling, being thus insulated from the other leg or wire which passes through or over the metal parts of the coupling.

9. The combination of a coupling having its metallic parts insulated from the inner surface of the hose by the hose itself, the abutting ends of which are turned back over parts of the coupling, clamped in that position and pressed firmly together by the other parts thereof, with any electric circuit for signaling, including conductors, connections, circuit-breakers, transmitters and receivers, so arranged that one leg or wire passes through or is connected inside of the hose at the coupling, and is insulated by the hose and its abutting ends from the other leg or wire, which passes outside the coupling, through or over the metallic parts.

10. The combination with hose-sections having their adjacent ends turned over or back, forming flanges, the ends or bends of which are adapted to abut against each other, of inner coupling-sections each projecting into the space between the body of a hose-section and the flange thereof, clamping-sections each surrounding one of the inner sections and arranged to clamp the hose-flange against it, and a nut to turn on one of the outer sections adapted for a screw connection with the other clamping-section, so arranged that when the nut is screwed up on the other clamping-section, the flanges will be pressed together by the inner coupling-sections and backed by the nut, and embedded in each section of hose two wires out of contact with each other, the end of one connected by contact-plate or otherwise with the inner coupling-section, and connecting through the outer sections of the coupling with a similar plate or wire in another section of hose or stand-pipe or nozzle, the end of the other wire entering the tube of the hose inside the coupling, and terminating in a contact-plate which may be connected by a suitable device with a similar plate and wire in another hose-section or stand-pipe or nozzle.

In testimony whereof I have signed my name to this specification in the presence of two subscribing witnesses.

HARRISON T. CRONK.

Witnesses:
 MIRON W. NEAL,
 RANDALL H. LUDLOW.